July 16, 1929.    E. W. DAVIS    1,721,248
CARD INDEX SYSTEM
Filed Oct. 23, 1920    2 Sheets-Sheet 1
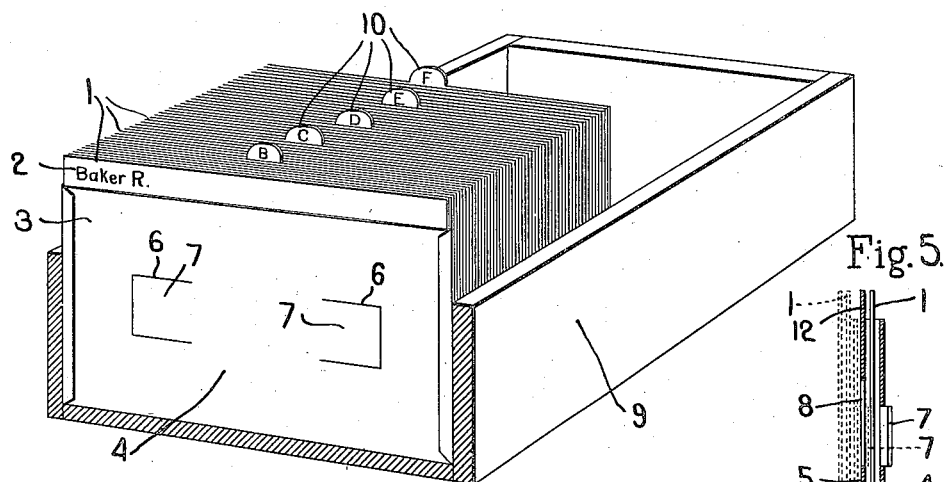
Fig.1.
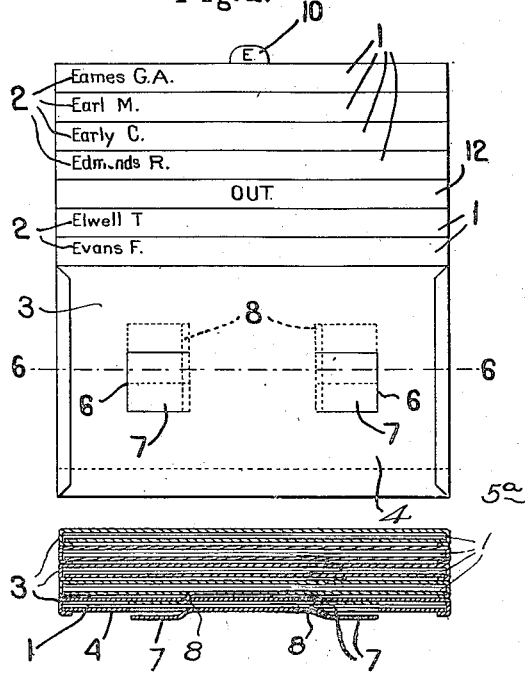
Fig.2.
Fig.6
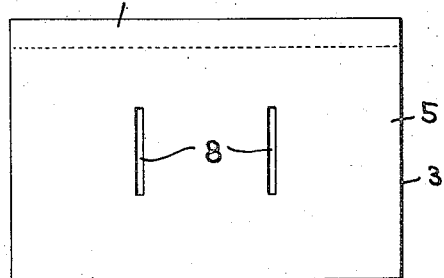
Fig.3.
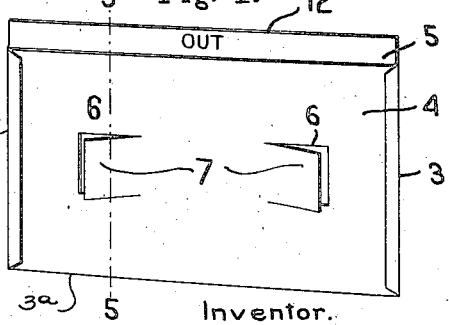
Fig.4.
Inventor.
Elmer W. Davis
by Heard Smith & Tennant
Attys.

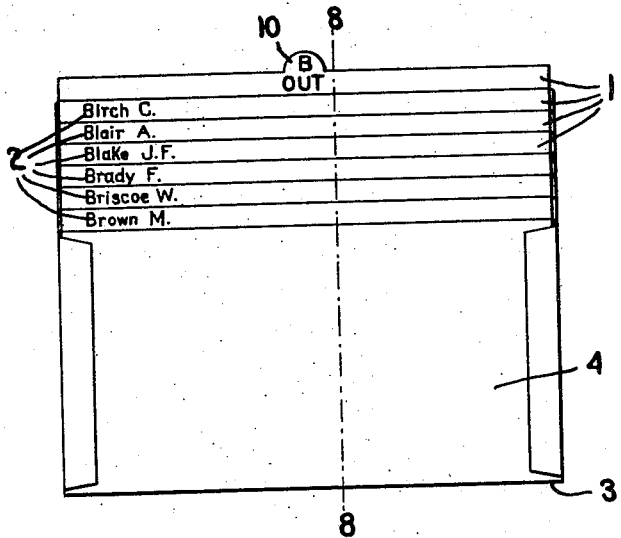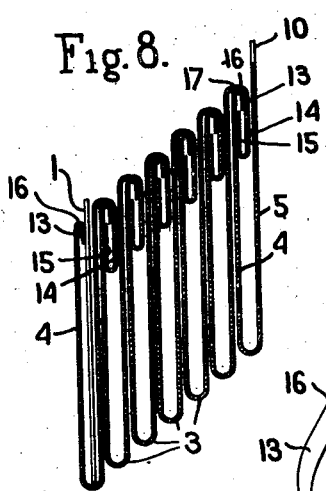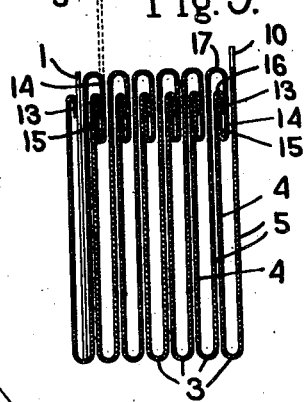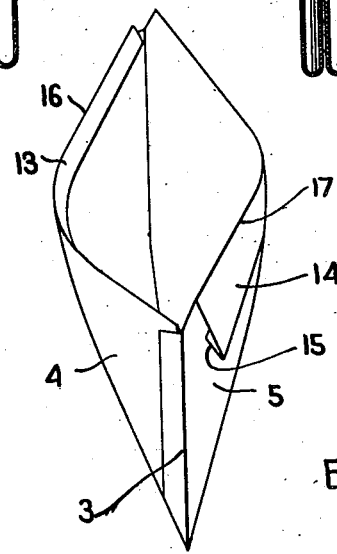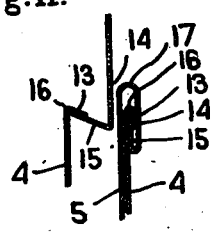

Patented July 16, 1929.

1,721,248

UNITED STATES PATENT OFFICE.

ELMER W. DAVIS, OF NEWTON, MASSACHUSETTS, ASSIGNOR TO SHAW-WALKER COMPANY, OF MUSKEGON, MICHIGAN, A CORPORATION OF MICHIGAN.

CARD-INDEX SYSTEM.

Application filed October 23, 1920. Serial No. 418,929.

There are now in common use two systems of card indexes. In one system, which I will refer to as the tray system, the separate cards are arranged in a drawer or tray, and in the other system, which I will refer to as the overlapping card system, the cards are supported on a frame in overlapping relation, so that either the top or the bottom margin of each card projects beyond the card directly in front. In using the tray system it is necessary for the operator to pick over the various cards in order to locate any desired card, because the cards in the tray are all supported at the same level, and each card completely hides the matter imprinted on the card behind it. Therefore in order to find any card it is necessary to pick over the cards so as to separate one card from another sufficiently to read the notation on the cards.

In the overlapping card system the name or identifying designation of each card is placed on the upper edge, and because of the overlapping relation of the cards, the upper edges of the cards are visible at all times so that any particular card can be selected at once, and without the necessity of any manual work in picking over the cards.

It is the principal object of my present invention to provide a card index of the tray system type, which is so constructed that the cards can be quickly placed in the overlapping relation, thus facilitating the selection or identification of any particular card.

My invention is such that it may be applied to any card system of the tray type now in use, and therefore it provides a means by which a card system of the tray type can be given the principal advantage inherent in a card system of the overlapping type.

In carrying my invention into practice, I propose to employ a plurality of pockets each adapted to contain a card, each pocket being so constructed that when the card is located therein, the upper edge of the card will project a slight distance above the front wall of the pocket. These various pockets, each with its card therein, are detachably fastened together in such a way that the pockets may be all arranged in line with each other, or they may be shifted into an overlapping relation with the exposed edges of the cards located one above the other. The pockets with their contained cards can thus be placed in a drawer or tray in the same way that the cards of an ordinary tray system are, but when the drawer is open the cards can be instantly shifted into their overlapping relation, thus exposing the top edges of the cards, so that the operator can instantly pick out the card which he desires.

In order to give an understanding of my invention, I have illustrated in the drawings a selected embodiment thereof, which will now be described, after which the novel features will be pointed out in the appended claims.

Fig. 1 is a perspective view of a card index embodying my invention showing the position it keeps when located in the drawer or tray;

Fig. 2 illustrates a section of the card index shifted to place the cards into the overlapping relation;

Fig. 3 shows a backside view of one of the pockets.

Fig. 4 is a front view thereof.

Fig. 5 is a section on the line 5—5, Fig. 4.

Fig. 6 is a section on the line 6—6, Fig. 2.

Fig. 7 is a view similar to Fig. 2 showing a different embodiment of the invention.

Fig. 8 is a section on the line 8—8, Fig. 7.

Fig. 9 is a sectional view on the line 8—8, Fig. 7 showing the pockets arranged in line with each other.

Fig. 10 is a perspective view of one of the pockets shown opened.

Fig. 11 is a fragmentary sectional view showing the manner in which the pockets illustrated in Figs. 8 and 9 are separated from each other.

The various cards of the card index system are indicated at 1 and each is shown as having the identifying name printed on the card at the top edge thereof, as shown at 2. These cards are such as are commonly used in the tray system of card indexes.

In accordance with my invention, each card is provided with a pocket in which the card is received, said pocket being indicated generally at 3. Each pocket is shown as being provided with a front wall 4 and a rear wall 5, which are connected at the end by means of flaps 5ª integral with the rear wall 5 and folded over and secured to the side margins of the front wall 4. The front and rear walls are connected along the bottom of each pocket by a fold line 3ª, but which are disconnected at the top, thus making an open top pocket. The pocket is of a proper depth to receive the card, but the front 4 of the pocket is of less vertical dimension than the card, so that when the card is in the pocket, the top marginal portion of the card will project above the front of the top, thus exposing to view the identifying name 2. Each pocket is connected to the adjacent pocket by means which permits the pockets to have a vertical movement relative to each other sufficient to permit the pockets to be placed all in line with each other, as indicated in Fig. 1, or to permit the pockets to be shifted to have the overlapping relation shown in Fig. 2.

Various ways of thus connecting the pockets may be employed without departing from my invention. In Figs. 1 to 6 the front of each pocket is slit in two places, as shown at 6, thereby to make two tabs or tongues 7 which are oppositely disposed. The back of each pocket is provided with two slots 8 which are so situated that the tabs 7 of the adjacent pocket can be passed through the slots. The slots are longer than the width or vertical dimension of the tabs by an amount which is approximately equal to the width of the top, marginal portion of each card on which the identifying name 2 is imprinted. When each pocket is arranged so that the tabs 7 thereon are at the lower ends of the slots 8 of the pocket directly in front, then the pockets are all in line with each other as indicated in Fig. 1, and when in this relation the pockets with the cards therein can be placed in a tray or drawer 9 in the same manner as is done with relation to the cards of an ordinary tray system card index. On the other hand, if each pocket is shifted vertically relative to the pocket directly in front so as to bring the tabs 7 of the pockets to the upper ends of the slots 8, then the pockets will have the overlapping relation shown in Fig. 2, and this will bring the cards into overlapping relation with the upper, marginal portions of all the cards exposed, so that the identifying names 2 on all the cards are visible at the same time.

For dividing the pockets into series or groups, guide cards having tabs 10, bearing alphabetical or other suitable designations are used, as shown in Figure 1. These guide cards are of a stiff material such as card board, and are preferably attached to the rearmost pocket of each series in some desired manner, such as by the provision of tongues similar to those (7) cut in the front walls 4 of the pockets and engaging the slots 8—8 in the pocket just in front of it. The guide card 5 may or may not be movable with respect to the adjacent pocket in the series, since the extended tab 10 serves as a tongue which can be grasped in expanding the series for reference purposes.

In Figs. 7 to 11 I have shown a different embodiment of the invention by which the different pockets are detachably connected together without the use of the tabs 7.

In Figs. 7 to 11 the front wall 4 of each pocket has its upper marginal portion folded inwardly to form a lip 13 which is located within the pocket and also has the upper portion of the back wall 5 folded outwardly at 14 and upwardly as shown at 15. To connect the pockets, the outwardly folded portion 14 of each pocket is inserted into the open top of the pocket immediately behind, the ends of the turned-over portions 14 terminating short of the ends of the pockets so as to enable this to be done. When the turned-over portion 14 is thus inserted into the open top of the pocket next behind, the lip 15, which tends to separate slightly from the portion 14 will engage beneath the lip 13 on the front of the adjacent pocket thereby holding the pockets together. The folding of the lip 13 along the edge 16 furthermore reduces the vertical dimension of the front wall 4 of the pocket, so that said edge 16 is spaced below the top edge 17 of the rear wall 5, thereby permitting the top marginal portion of the card 1 to be exposed to view from the front of the index, as clearly shown in Figures 8 and 9. The portion 14 is made with a greater vertical dimension than the lip 15 or the lip 13, and as a result when the pockets are assembled each pocket will be permitted to move upwardly slightly with relation to the pocket in front as shown in Fig. 8. When the pockets are assembled as shown in Fig. 9 the folded top edge of the front of each pocket will be received between the back of the pocket in front and the portion 14 of said back and folded lip 13 of the front will be situated below the top edge 17 of the back by an amount substantially equal to that which is occupied by the name or other identifying words at the point 2 on the card. When in this relative position, the pockets are held together by the engagement of the lips 13 and 15. If a series of connected pockets is raised, the pockets will assume an overlapping position shown in Fig. 8, each pocket being raised relative to the pocket in front until the folded edge 16 of the front of each pocket will engage the under side of the folded edge 17 of the rear of the pocket in front. When the pockets are in this overlapping relation, the cards 1 in said pockets will be placed in the overlapping relation shown in Fig. 7 thus exposing the portion 2 of all the cards to view.

If the complete card system is a small one and comprises only a few cards, then all of the pockets may be connected together as above described, but if the card system is a more extensive one, then I propose to divide the pockets into sections, with the pockets of each section connected as above described, but with the sections separate from each other. If desired, guide cards with tabs can be used for sub-dividing the cards, or in place of the guide cards I may make certain of the pockets with index tabs which serve to sub-divide the cards. Such index tabs on the pockets are shown at 10, and these may either be integral with the pockets, or detachably secured thereto. I prefer to make the tabs detachable from the pockets, so that the tabs can be associated with any pocket according to the number of sub-divisions desired. This may be accomplished by making the tab 10 on a separate card 11, which is provided with the connecting tabs 7 adapted to fit into the slots 8 of the pocket to which it is to be attached. These tabs or tongues 7 are formed in the cards 11 by cutting slits 6 in the same manner and at the same location as described in connection with the pockets 3. With this construction the guide cards 11 with their index tabs may be associated with any desired index card according to the degree which it is found convenient to sub-divide the cards. Under some conditions, it may be the most convenient to arrange the pockets so that each section of connected pockets will contain those between adjacent index cards 11. When this arrangement is made, the operation of locating any card will involve merely selecting the section of pockets by means of the index tab which contains the desired card, and then pulling upwardly on the index tab so as to arrange the pockets of this section in their overlapping relation. When this is done the identifying names 2 on all cards of this section are exposed to view, so that a desired card can be readily selected. With my improvement, therefore, the laborious and sometimes tedious operation of picking over the cards in the tray or drawer to locate the desired card is entirely obviated, and the location of any card can be found with approximately as great facility as is possible when using a card system of the overlapping card type.

Each card is easily removable from its pocket so that any card can be taken out from the tray for the purpose of having added data placed thereon, or for any other purpose.

I may if desired make each pocket with the back 5 slightly higher than the front so that when the card is removed from the pocket, the top of the back will project above the front. When this construction is employed, it may be found convenient to have the word "Out" or some similar word imprinted on the projecting portion 12 of the back of each pocket, so that when any card is removed from the pocket and the pockets are then placed in overlapping relation, the word "Out" on the empty pocket will be exposed to view, thus showing that a card is missing.

The connection between the pockets herein illustrated is a detachable one, so that it is possible to remove any pocket from the series by disconnecting it from the pockets on each side thereof. Furthermore, it is a simple matter to insert a new pocket at any location by simply separating the pockets at the place where the new pocket is to be inserted, and then connecting the new pocket to those in front and in the rear. The index cards 11 can also be detachably secured to any pocket, and therefore the card index system herein shown is as elastic and capable of expansion or contraction as the ordinary tray system card index.

With the construction shown in Figs. 1 to 6 the separate pockets can be easily detached by pulling them apart, the flexibililty of the tabs 7 permitting this. The pockets can also be readily connected together by simply inserting the tabs 7 of one pocket into the slots 8 of another pocket.

With relation to the construction shown in Figs. 7 to 11 the pockets can also be readily separated from each other by simply withdrawing the portion 14 of one pocket from the pocket back of it. For instance, if it is desired to separate the left hand pocket in Fig. 9 from the other pockets said pocket will be swung around into the dotted line position so that the back 5 of the pocket and the portion 14 will be in line with each other and then if the pocket is pulled upwardly the lips 13 and 15 will open until they are disengaged from each other as shown in Fig. 11.

The construction shown in Figs. 7 to 11 has the advantage that the interior of each pocket is free from obstructions such as are caused by the tabs 7. Another advantage of this construction is that the pockets can be more quickly assembled or connected together, this operation involving simply the insertion of the portion 14 of one pocket into the mouth of the adjacent pocket.

With my invention, therefore, it is possible for any person whose office is already equipped with a tray system card index and the proper trays or draws therefor, to convert such card index into a system having all the advantages of the overlapping system, by simply providing the requisite number of pockets 3 and index cards 11.

I claim:

1. In a card index system, the combination of a tray, a series of individual card-holding members consisting of sheets of fibrous material folded to form connected front and rear walls and having an opening between their top edges, the top marginal portion of said front and rear walls being folded into tongues adapted for interlocking connection with the tongues of adjacent members, and adapted to permit a limited vertical displacement of said members relative to each other upon the vertical withdrawal of one of said members from said tray.

2. In a card index system, the combination of a tray, a series of individual card-holding members consisting of pockets open along their top edges and normally supported in line and in upright position in said tray, a series of cards removably inserted in said pockets with their top marginal portions projecting therefrom, and means connecting said pockets together whereby in the vertical withdrawal of the rearmost pocket from said tray, the pockets in front thereof are displaced one below the other, thereby exposing a marginal portion of said cards from the front of said tray.

3. In a card index system, the combination with a tray, of a plurality of individual card-holding members adapted to support a series of index cards in upright position in said tray, said card-holding members being connected together for relative vertical displacement, whereby said cards are elevated one above the other in the vertical displacement of said card-holding members.

4. In a card index system, the combination with a tray, of a series of card-holding members open along one edge and normally supported in upright position in said tray, a series of index cards adapted to be inserted individually into said card-holding members with a marginal portion visible at the open edges of their respective card-holding members, the latter being connected together for limited displacement in planes parallel to those of said cards, whereby in the displacement of one of said card-holding members the remaining members are displaced to arrange said cards with their marginal portions visible one beyond the other.

5. In a card index system, the combination with a tray, of a series of individual card-holding members adapted to be supported in upright position in said tray and having openings along their top edges, a series of index cards adapted to be inserted individually into said card-holding members with their top marginal portions exposed above their respective members, said card-holding members having interlocking sliding connection with each other, whereby each may be displaced vertically a limited distance above an adjacent member upon the vertical withdrawal of one of said members from said tray.

6. In a card index system, the combination with a tray, of a series of card-holding members adapted to receive individual cards with their upper marginal portions exposed, said card-holding members being connected together for relative vertical displacement, sufficient to elevate the exposed portion of each card above the top of an adjacent card.

7. In a card index system, the combination with a tray and a plurality of index cards, of a plurality of individual card-holding members of fibrous material folded to form front and rear walls and openings along their upper edges to receive said cards, each of said members having interlocking connection at its front and rear walls with the card-holding members rearwardly and forwardly thereof, whereby each card-holding member and its card has a limited vertical displacement above the member and card immediately in front thereof.

In testimony whereof, I have signed my name to this specification.

ELMER W. DAVIS.